Sept. 8, 1931.  E. P. G. WÜNSCH  1,822,184
DEVICE FOR THE CONVERSION OF MECHANICAL MEASURING VALUES
INTO CORRESPONDING ELECTRICAL MEASURING VALUES
Filed Dec. 22, 1927
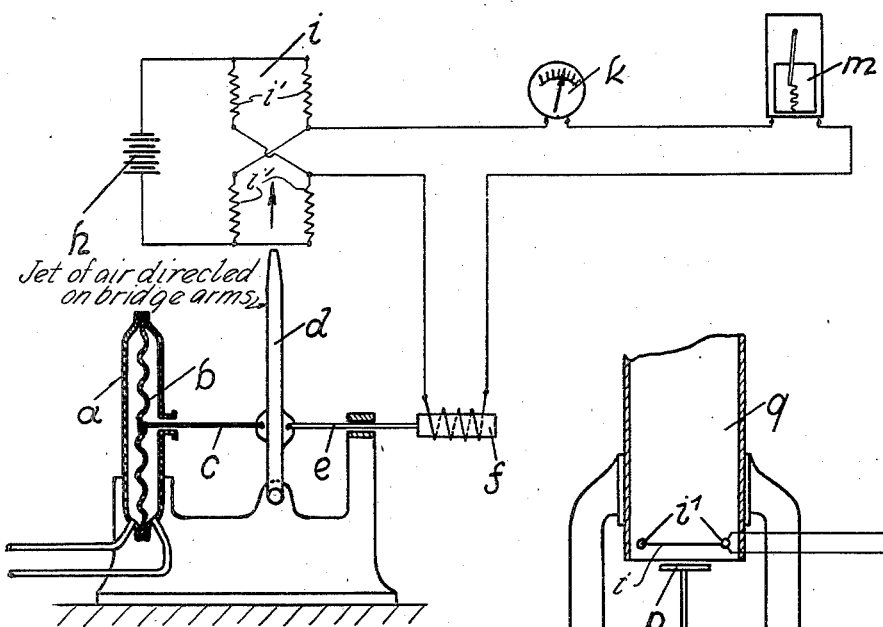
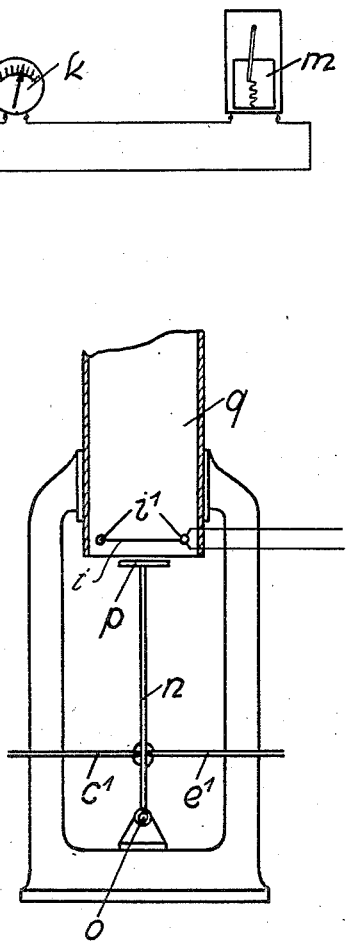
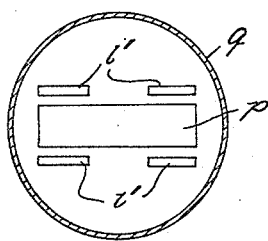
Inventor:
Erich Paul Guido Wünsch
by Emil Bönnelycke
attorney Patented Sept. 8, 1931

1,822,184

UNITED STATES PATENT OFFICE

ERICH PAUL GUIDO WÜNSCH, OF STEGLITZ, NEAR BERLIN, GERMANY, ASSIGNOR TO ASKANIA-WERKE AKTIENGESELLSCHAFT VORMALS, CENTRALWERKSTATT DESSAU UND CARL BAMBERG-FRIEDENAU, OF BERLIN-FRIEDENAU, GERMANY

DEVICE FOR THE CONVERSION OF MECHANICAL MEASURING VALUES INTO CORRESPONDING ELECTRICAL MEASURING VALUES

Application filed December 22, 1927, Serial No. 241,987, and in Germany December 21, 1926.

It is already known for the purpose of measuring mechanical values with electric distant transmission to convert the mechanical measuring values into the corresponding electrical measuring values in such a manner that the mechanical measuring pressure is determined from a strength of current to be measured. It is further known in measuring mechanical values to cause them to act on a diaphragm or the like, by means of which a gas or liquid current is set in a given manner and according to the direction of the escaping gas current, the latter operating a regulating device proper or producing a mechanical force which counteracts or acts in opposition to the movement of the diaphragm, and the value of which is mesaured. Such known structures are, for example, shown in U. S. Patents Nos. 1,558,529 and 1,620,707.

The present invention has for its object the application of the measuring arrangement of the last mentioned kind to the conversion of mechanical measuring values into electrical ones. To this end, the gas current regulated by the mechanical value, is utilized for the regulation of the heat of electric resistance wires, while the current correspondingly regulated by the regulation of the resistance, is used for the production of the force which acts in opposition to the mechanical measuring value.

The drawings show diagrammatically by way of example two constructions according to the invention.

In the drawings:

Figure 1 is a diagrammatic view of a system according to the invention,

Fig. 2 is a side view, partly in section, of a number of modified details, including the tubular member, and Fig. 3 is a cross-sectional view of the tubular member showing the resistors and plate of Fig. 2.

In Figure 1, $a$ is a casing divided into two parts by a diaphragm $b$. When it is a question for instance of the conversion of a pressure into an electrical measuring value, one compartment of the casing $a$ is connected to the pressure in question, while the other one is exposed to atmospheric pressure. When it is a question of determining a pressure difference the two pressures are transmitted to the two compartments in the casing $a$, so that the diaphragm $b$ assumes a position in accordance with their difference. To the diaphragm $b$ is hinged a rod $c$, the free end of which is connected to a jet pipe $d$, that is to say to a pipe constantly traversed by compressed air or by liquid under pressure. The pipe $d$ is further connected by means of a connecting rod $e$ to an iron core $f$ which is arranged within a coil $g$.

The coil is included in a circuit which is connected to a battery $h$. The current passes through a Wheatstone bridge $i$, that is, through the resistors or arms $i'$, and passes, in addition, to the coil, also through any desired line to the measuring or setting device. It could for instance operate therefore an ammeter $k$ or a recording instrument $m$ or a servomotor which effects any desired setting and the like. The pipe $d$ is provided with a nozzle, the stream from which is directed against the resistance of the Wheatstone bridge. When the current of compressed air or of liquid under pressure blows through in the middle between the resistances, the resistances which are opposite each other, will be uniformly cooled by the air current, so that no change in the strength of the current in the line will take place. If however the pressure changes, the jet pipe $d$ will be deflected by the diaphragm $b$ to one or to the other side, consequently the bridge resistance will be cooled by the air current in a different manner, and a current of different strength will be produced in the galvanometer wires. This current will pass through the coil $g$, act on the iron core $f$ and bring the diaphragm $b$ back again, and an equilibrium will be produced in which the counter force produced by the electric current in the coil $g$, will balance the measuring pressure. The current strength then existing is proportional to the measuring pressure, and by measuring this strength of current, it is possible to determine directly the measuring pressure.

If the current is caused to operate a servomotor, this servomotor will exercise a greater or smaller action according to the strength of the current.

Into the current conductors or lines could be switched any desired number of indicators, recording instruments, meters, etc. The measuring is independent of the voltage of the battery $h$ as the setting depends exclusively on the strength of current.

Figure 2 shows a modified construction according to the invention. Here in place of the jet pipe $d$ is provided a lever $n$ which is pivoted about a pin $o$ and carries at its free end a screen or a plate $p$. The resistances $i'$ of the Wheatstone bridge are here enclosed by a tubular part $q$. With the lever $n$ engaging the two rods $c'$ and $e'$ of which one is connected to the diaphragm $b$ in accordance with the rods $c$ and $e$ in Figure 1, and the other to the iron core $f$. For the rest, the arrangement is the same as in Figure 1.

Owing to the heating of the resistances $i'$ by the source of current $h$, an upward current of air is produced in the tube $q$ which, current as long as the screen $p$ is in the middle, cools all the resistances in the same way. If however the screen $p$ is moved in one or other direction by the lever $n$ under the action of the diaphragm $b$ or of the coil $f$, the screen $p$ will be brought under one or the other resistance, and will thus affect the air flow, so that the resistances on one or other side will be cooled to a greater extent, and in this way the measuring current as in the example given in the foregoing is produced.

Having now particularly described and ascertained the nature of my said invention and in what manner the same is to be performed, I declare that what I claim is:—

1. A device for the conversion of mechanical measuring values into corresponding electrical measuring values, comprising means influenced by the mechanical measuring values for directing a fluid current, and a Wheatstone bridge having a number of resistances, the temperatures of which are thereby regulated by said fluid current being directed on one of the resistances whereby at the same time the electric conductivity of said resistances is controlled and the electric current flowing through the Wheatstone bridge is varied, and electro-mechanical means connected to the mid-point of the bridge to act in opposition to the mechanical measuring pressure, and current measuring means in circuit with the electro-mechanical means so that the measuring pressure may be determined from the current strength obtained.

2. A device for the conversion of mechanical measuring values into corresponding electrical measuring values, comprising means including a jet pipe for directing a fluid current influenced by the mechanical measuring values upon one of the resistors of a Wheatstone bridge, the temperatures of which are thereby regulated by the fluid current issuing from the jet pipe whereby at the same time the electric conductivity of said resistors is controlled and the electric current flowing through the Wheatstone bridge is varied, electro-mechanical means connected to the mid-point of the bridge to act in opposition to the mechanical measuring pressure, and current measuring means in circuit with the electro-mechanical means so that the measuring pressure may be determined from the current strength obtained.

In testimony whereof I have affixed my signature.

ERICH PAUL GUIDO WÜNSCH.